United States Patent [19]

Aylor

[11] 4,245,746
[45] Jan. 20, 1981

[54] PHONOGRAPH RECORD STORAGE RACK

[76] Inventor: Eugene W. Aylor, Brightwood, Va. 22715

[21] Appl. No.: 12,218

[22] Filed: Feb. 9, 1979

[51] Int. Cl.$^3$ .............................................. A47F 7/00
[52] U.S. Cl. ..................................... 211/40; 211/184
[58] Field of Search ................... 108/60, 61; 211/184, 211/43, 41, 40

[56] References Cited

U.S. PATENT DOCUMENTS

| | | | |
|---|---|---|---|
| 534,116 | 2/1895 | Lyons | 211/184 |
| 1,046,488 | 12/1912 | Pauley | 108/61 |
| 1,863,625 | 6/1932 | Fenstermaker | 108/61 |
| 2,379,126 | 6/1945 | Welden | 211/184 |
| 3,530,997 | 9/1970 | Djorup | 211/184 |

FOREIGN PATENT DOCUMENTS 1421916 11/1965 France ..................................... 211/40

Primary Examiner—Roy D. Frazier
Assistant Examiner—Robert W. Gibson, Jr.
Attorney, Agent, or Firm—Mason, Fenwick & Lawrence

[57] ABSTRACT

A storage rack is disclosed for supporting conventional phonograph records in a generally upright position including side rails and end rails forming an open sided box-like structure with parallel and separated rods extending along the length of the structure between with a spacer member having surfaces engaging an upper and a lower rod in such a manner as to deflect the upper and the lower rod and frictionally retain the spacer member in a desired position to provide support for phonograph records when the rack is not entirely filled.

3 Claims, 7 Drawing Figures

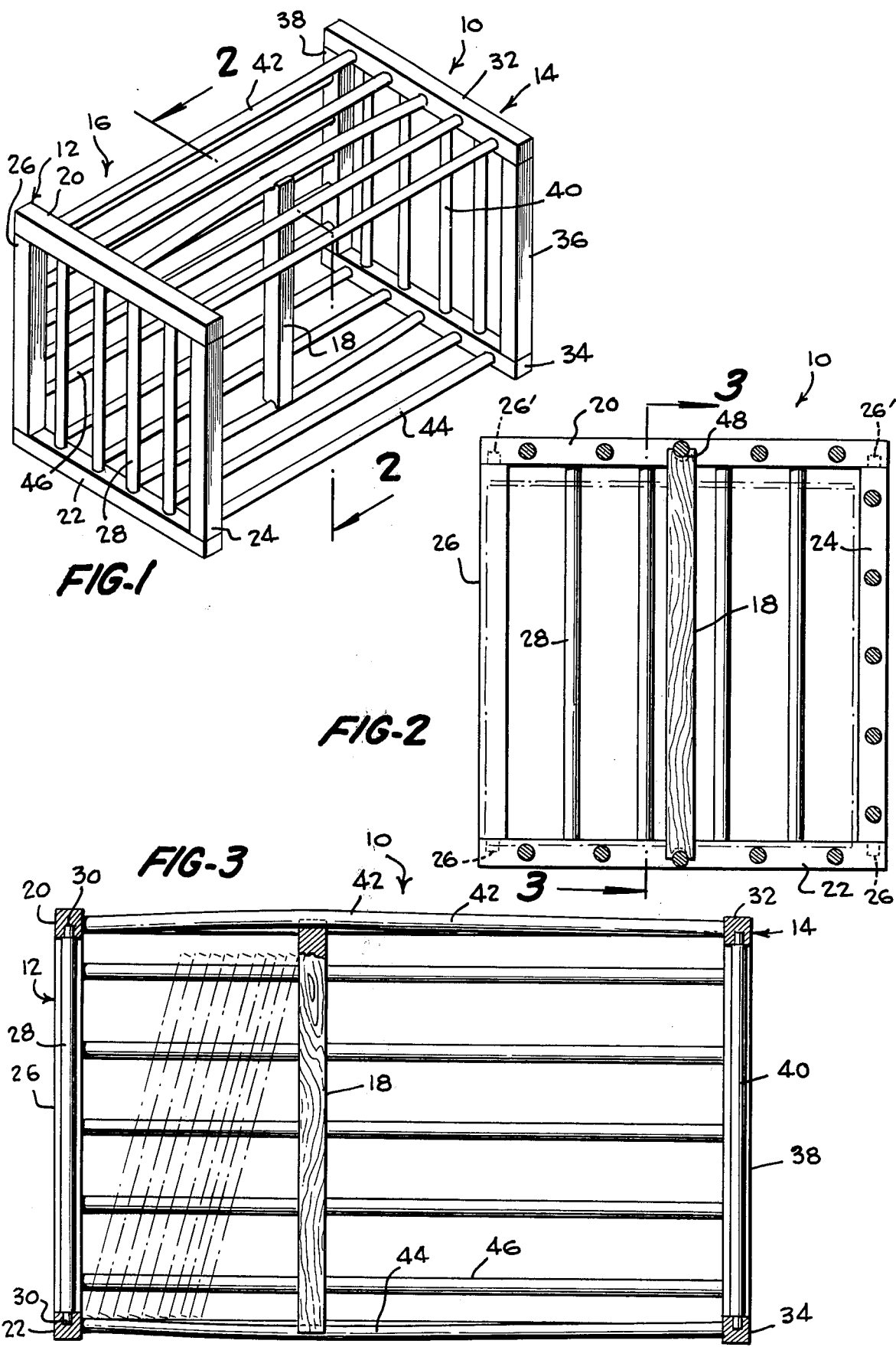

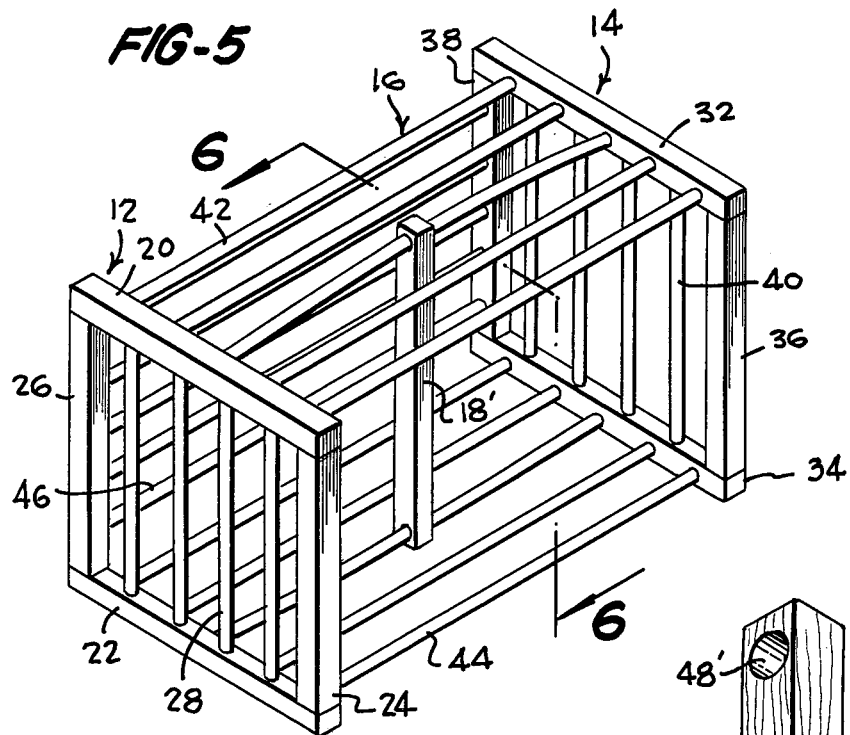
FIG-5
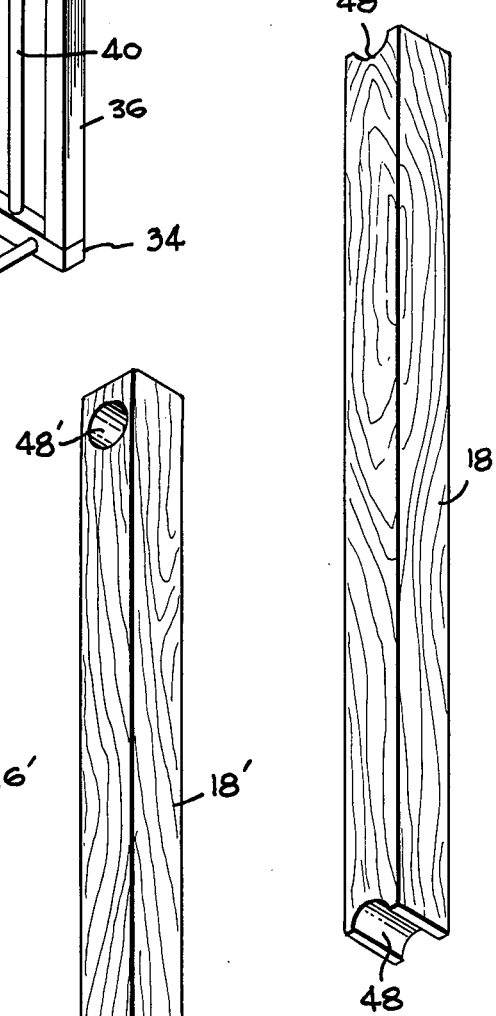
FIG-4
FIG-7
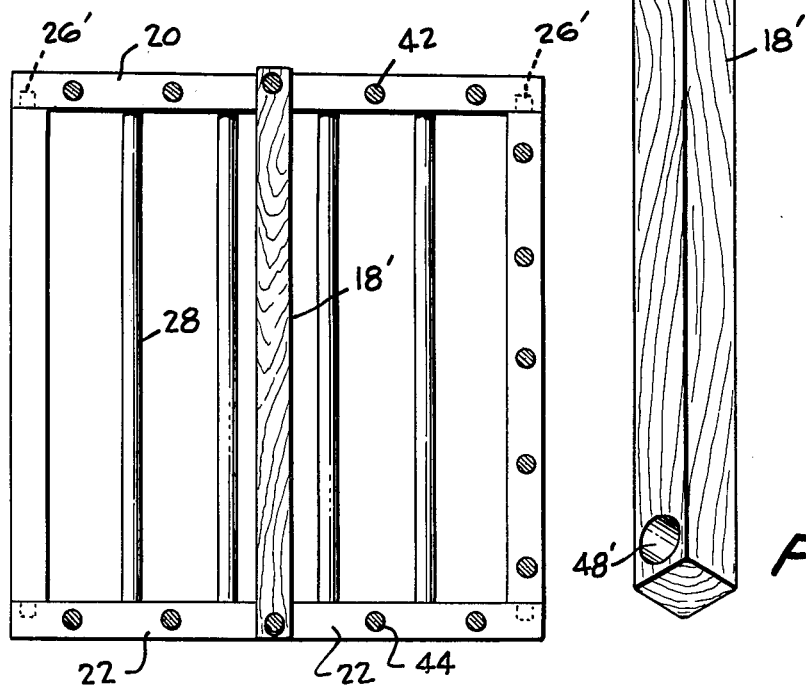
FIG-6

PHONOGRAPH RECORD STORAGE RACK

This invention is in the field of storage racks and is specifically directed to a storage rack for retaining phonograph records and record albums in an upright position during storage.

Prior known phonograph record album storage racks have usually been of the type having numerous fixed upright dividers for retaining various quantities of phonograph records and/or record albums in an upright position. This type of storage rack has reduced the space available for retention of records or albums by the amount of space required for the numerous dividers and has been expensive and complicated to manufacture due to the inherent complexity of fastening numerous dividers within the container. Previously, crates which have been used for transporting and shipping melons and the like have also been utilized for storing phonograph records in an upright position; however, these crates have permitted the records to slide into horizontal positions unless the crates were filled with records. Warping and twisting of the records results if they remain in the horizontal or sharply inclined position for extended periods of time.

Therefore, it is the object of the present invention to provide a new and improved storage rack for phonograph records and albums.

Another object of the present invention is to provide a phonograph record storage rack having a movable spacer or divider member which can be positioned in a desired location to provide support for the phonograph records when there is an insufficient number of records to fill the entire rack.

A further object of the present invention is to provide a phonograph record storage rack which is lightweight in construction, relatively inexpensive to manufacture and aesthetically pleasing to the eye of the user.

A still further object of the present invention is to provide a front opening phonograph storage rack in which the top, bottom and rear walls are formed of parallel sets of dowels or rods and a positionable spacer is frictionally retained between a pair of the parallel spaced apart elongated dowels or rods of the top and bottom walls thereby permitting quick and easy positioning of the spacer to accommodate various quantities of phonograph records within the rack while avoiding the possibility of any of the records sliding into a horizontal position.

The objects of this invention are obtained through the provision of a phonograph record storage rack including a first pair of end edge rails and a second pair of end edge rails interconnecting the ends of the first pair of end edge rails to form a rectangular frame for a first end section. A second end section frame is formed by a third pair of end edge rails which are interconnected by a fourth pair of end edge rails interconnecting the ends of the third pair of end edge rails. Dowels or rods may extend vertically or horizontally between pairs of the edge rails to complete the end sections. At least one upper rod interconnects the top edge rail of the first end section and the top edge rail of the second end section and a lower rod interconnects bottom edge rails of the first and second end section parallel to the upper rod. A spacer member extends between the upper and lower rods and has engaging surfaces which contact the inner mutually confronting surface of these rods with the engaging surfaces spaced apart a distance greater than the distance between confronting surfaces of the rods thereby causing a deflection of the rods when the spacer member is inserted therebetween to retain the spacer member in a desired location and provide a positionable separator for the record storage rack.

A better understanding of the manner in which the preferred embodiment of the invention achieves the objects of the invention will be enabled when the following written description is read in conjunction with the appended drawings, in which:

FIG. 1 is a perspective view of a preferred embodiment;

FIG. 2 is a cross-sectional view taken along line 2—2 of FIG. 1;

FIG. 3 is a cross-sectional view taken along line 3—3 of FIG. 2;

FIG. 4 is an enlarged perspective view of the spacer member shown in FIGS. 1, 2 and 3;

FIG. 5 is a perspective view of an alternative embodiment;

FIG. 6 is a cross-sectional view taken along line 6—6 of FIG. 5; and

FIG. 7 is an enlarged perspective view of the spacer member shown in FIGS. 5 and 6.

Referring to the drawings, wherein like reference characters designate corresponding parts throughout the several figures, there is shown in FIGS. 1 through 4 of the drawings an embodiment of the invention, wherein the record storage rack is indicated generally by reference numeral 10 and includes a first end section 12, a second end section 14, and open, grill-like rear, top and bottom walls formed of dowels or rods 16, hereinafter usually referred to simply as rods, interconnecting the end sections 12, 14, and including a spacer bar 18.

The first end section 12 includes an upper end edge rail 20 and a lower end edge rail 22 to form a first pair of end edge rails with the upper end edge rail being interconnected with the lower end edge rail 22 by a second pair of end edge rails 24 and 26 having a mortis and tenon joints 26 formed between the ends of upright end edge rails 24 and 26 and the upper and lower end edge rails 20 and 22 as shown in FIG. 2 to form a rectangular end frame. The end edge rails are preferably formed of wood, such as oak, although many other materials utilizing the same or different construction will also provide the necessary structure.

Extending vertically between the upper and lower end edge rails 20 and 22 are rods 28 fitted in sockets therefor in the top and bottom rails or having mortis and tenon joints 30 at opposite ends thereof between the rods 28 and the upper and lower end edge rails, as shown in FIG. 3. These rods 28 could extend between the vertical end edge rails 24 and 26 or may be left out entirely if so desired. The mortis and tenon joints 26 and 28 may be permanently assembled by the use of adhesives, nailing, wedging or the like depending on the desired manufacturing process and appearance of the finished product.

The second end section 14 is similar to the first end section 12 and has an upper end edge rail 32, a lower end edge rail 34 forming the third pair of end edge rails, and vertical end edge rails 36 and 38 forming a fourth pair of end edge rails interconnecting the third pair of end edge rails to form the rectangular end frame. Vertical rods 40 in like manner connect the upper end edge rail 32 with the lower end edge rail 34 to provide structural rigidity and the desired appearance for the finished product.

The top, bottom, and rear walls of the rack are formed of spaced sets of parallel dowels or rods 16 providing an open, grill-like wall structure. The longitudinal rods 16 include upper horizontal rods 42 extending between the upper end edge rails 20 and 32 as shown in FIG. 1 with the ends thereof fixed to the upper end edge rails by sockets or mortis and tenon joints similar to that shown for the vertical rods 28 in FIG. 3. Extending between the lower end edge rails 22 and 34 are lower horizontal rods 44 fixed to the lower end edge rails in a manner similar to the upper longitudinal rods 42 and positioned to be parallel with the upper longitudinal rods 42. Extending between the rear vertical end edge rails 26 and 38 are rear horizontal longitudinal rods 46 which are fixed to the vertical end edge rails 26 and 38 in like manner. The longitudinal rods 42, 44 and 46 are preferably formed of wood, for example hickory wood to provide a resilient and strong structure.

The spacer member 18 is generally rectangular in cross-section being formed from a strip of oak wood or the like. The opposite ends of the spacer member 18 include concave, semi-cylindrical surfaces 48 arranged along parallel axes, which may be formed by drilling a pair of holes of diameter equal or slightly larger than the rods 42 and 44 with the center line of the holes separated a distance slightly greater than the distance between the center lines of the rods 44 and 42. The spacer member 18 is severed across the diameter of the holes to provide a spacer member which may be inserted between and removed from between opposite pairs of the upper and lower longitudinal rods 42 and 44 as shown in FIGS. 1, 2 and 3. When the spacer member is positioned between a pair of the rods, it causes deflection of the upper and lower rods 42 and 44, as best shown in FIG. 3, to frictionally retain the spacer member 18 in a desired position. The spacer member then supports the phonograph records, as indicated by dotted lines in FIG. 3, while permitting the spacer member to be moved to the left or right as desired to provide the desired support for the records. When the rack is nearly filled with records, the spacer member 18 may be removed to provide additional space for storing records.

Referring now to the alternate embodiment shown in FIGS. 5, 6 and 7, the spacer member 18' is generally similar to spacer member 18 with the exception that the operative pair of concave surfaces engaging the rods 42, 44 is provided by a pair of parallel drilled holes 48' having their center lines spaced apart a distance slightly greater than the distance between the center lines of the upper longitudinal rod 42 and the lower longitudinal rod 44. The spacer member 18' is assembled with a pair of upper and lower longitudinal rods 42 and 44 extending therethrough as shown in FIG. 5. This configuration provides a spacer member which cannot be lost and yet is frictionally retained in any desired position along the length of the upper and lower longitudinal rods to provide support for phonograph records retained therein in a manner similar to that shown in FIG. 3.

The present invention provides a phonograph storage rack which is simple to use, lightweight and handsome in construction, and adjustable to retain phonograph records in a secure upright position to prevent warping thereof.

From the foregoing detailed description, it will be evident that there are a number of changes, adaptations and modifications of the present invention which come within the province of those skilled in the art. However, it is intended that all such variations, not departing from the spirit of the invention, be considered as within the scope thereof as limited solely by the appended claims.

I claim:

1. A record storage rack comprising a first rectangular loop end frame section, a second rectangular loop end frame section, a plurality of parallel upper elongated dowel members interconnecting said first end frame section and said second end frame section, a plurality of lower elongated dowel members interconnecting said first and second end frame sections in opposed relation and parallel to said upper elongated dowel members, and a spacer bar having an upper engaging surface positionable to contact an inner surface of one of said upper elongated dowel members and a lower engaging surface spaced apart a distance greater than the distance between said upper and lower elongated dowel members and positionable to contact an inner surface of a corresponding one of said lower elongated dowel members confronting said inner surface of said upper elongated dowel member thereby causing a deflection of said upper and lower elongated dowel members when said spacer bar is inserted therebetween to retain the spacer bar in a desired position to provide a positionable separator for said storage rack.

2. The storage rack of claim 1 wherein said first end frame section comprises a first pair of end edge rails, a second pair of end edge rails interconnecting the ends of said first pair of end edge rails to form the first end frame section, wherein said second end section comprises a third pair of end edge rails, a fourth pair of end edge rails interconnecting the ends of said third pair of said end edge rails to form said second end frame section, wherein said upper elongated dowel members interconnect an edge rail of said first end frame section and an edge rail of said second end frame section, and wherein said lower elongated dowel members interconnect an edge rail of said first end frame section and an edge rail of said second end frame section.

3. The record storage rack of claim 1 wherein said engaging surfaces are formed by parallel and spaced apart bores extending through said spacer bar and being of diameter larger than said rods with which said spacer bar engages.

* * * * *